(12) United States Patent
Takahashi et al.

(10) Patent No.: US 8,947,761 B2
(45) Date of Patent: Feb. 3, 2015

(54) OPTICAL ELEMENT, OPTICAL ELEMENT ARRAY, DISPLAY DEVICE, AND ELECTRONIC APPARATUS

(71) Applicant: Sony Corporation, Tokyo (JP)

(72) Inventors: Kenichi Takahashi, Kanagawa (JP); Hidehiko Takanashi, Kanagawa (JP)

(73) Assignee: Sony Corporation, Tokyo (JP)

(*) Notice: Subject to any disclaimer, the term of this patent is extended or adjusted under 35 U.S.C. 154(b) by 156 days.

(21) Appl. No.: 13/676,318

(22) Filed: Nov. 14, 2012

(65) Prior Publication Data
US 2013/0128337 A1    May 23, 2013

(30) Foreign Application Priority Data
Nov. 21, 2011  (JP) .................... 2011-254286

(51) Int. Cl.
G02B 26/00    (2006.01)
(52) U.S. Cl.
CPC .................... *G02B 26/005* (2013.01)
USPC ........................................ 359/290
(58) Field of Classification Search
CPC .................................. G02B 26/005
USPC ................................. 359/290, 291
See application file for complete search history.

(56) References Cited

U.S. PATENT DOCUMENTS

| 7,944,601 | B2 | 5/2011 | Gally et al. | |
|---|---|---|---|---|
| 2011/0286073 | A1* | 11/2011 | Lo et al. | 359/290 |
| 2013/0038922 | A1* | 2/2013 | Kirita | 359/316 |
| 2013/0141405 | A1* | 6/2013 | Huitema et al. | 345/205 |

* cited by examiner

*Primary Examiner* — James Jones
(74) *Attorney, Agent, or Firm* — Wolf, Greenfield & Sacks, P.C.

(57) ABSTRACT

An optical element includes: a first electrode and a second electrode that are arranged opposite each other, in which the first electrode allows part of incident light to pass therethrough and reflects another part of the incident light, and the second electrode reflects light that has passed through the first electrode; a first dielectric film and a second dielectric film covering the first electrode and the second electrode, respectively; and a first medium and a second medium each interposed and sealed in a space containing a cavity portion between the first dielectric film and the second dielectric film, in which the first medium and the second medium have refractive indices different from one another, and one of the first medium and the second medium is a polar liquid.

13 Claims, 5 Drawing Sheets

OPTICAL ELEMENT, OPTICAL ELEMENT ARRAY, DISPLAY DEVICE, AND ELECTRONIC APPARATUS

BACKGROUND

The present disclosure relates to an optical element and an optical element array which utilize an electrowetting phenomenon, and a display device and an electronic apparatus which are equipped with the optical element array.

Various display devices, including liquid crystal displays, plasma displays (PDPs), organic EL displays, and electronic papers, have been proposed and commercialized so far.

Furthermore, as one of display systems that disuse a color filter, recently, MEMS displays have been proposed, which are configured to interfere with and selectively reflect lights by employing a semiconductor MEMS technique (for example, see U.S. Pat. No. 7,944,601).

SUMMARY

For such display devices, currently, high performances, for example, high luminance and high-speed response despite low power consumption are increasingly in demand. Moreover, it is necessary to allow for the application to a large-sized screen.

It is desirable to provide an optical element and an optical element array which exhibit a superior responsibility and emit high-luminance light even at a low drive voltage. Furthermore, it is desirable to provide a display device and an electronic apparatus equipped with such an optical element array, which achieve a high display performance despite low power consumption.

According to an embodiment of the present disclosure, there is provided an optical element including: a first electrode and a second electrode that are arranged opposite each other, the first electrode allowing part of incident light to pass therethrough and reflecting another part of the incident light, and the second electrode reflecting light that has passed through the first electrode; a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

According to an embodiment of the present disclosure, there is provided an optical element array including: a first electrode, the first electrode allowing part of incident light to pass therethrough and reflecting another part of the incident light; a plurality of second electrodes arranged opposite the first electrode, the second electrodes reflecting light that has passed through the first electrode; a first dielectric film and a second dielectric film covering the first electrode and the second electrodes, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

In each of the optical element and the optical element array according to the above-described embodiment of the present disclosure, interference occurs between reflected light that is reflected by the first electrode and return light that is reflected by the second electrode(s) after entering the cavity portion through the first electrode. In this case, once a voltage is applied between the first electrode and the second electrode(s), energies change at respective interfaces between the first electrode and the polar liquid, which is one of the first and second media, and between the second electrode(s) and the polar liquid. As a result, a phenomenon in which a surface shape of the polar liquid changes occurs. Due to this phenomenon, the polar liquid is drawn to the cavity portion. Because the first and second media have the different refractive indices, interference condition is changed depending on which medium is present in the cavity portion. In more detail, an interference state generated when the first medium is present in the cavity portion is different from that generated when the second medium is present therein.

According to an embodiment of the present disclosure, there is provided a display device with multiple types of display elements, each of the display elements including: a first electrode and a second electrode that are arranged opposite each other, the first electrode allowing part of incident light to pass therethrough and reflecting another part of the incident light, the second electrode reflecting light that has passed through the first electrode, and an interval between the first electrode and the second electrode is different between the multiple types of display elements; a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

According to an embodiment of the present disclosure, there is provided an electronic apparatus with a display device, the display device being provided with multiple types of display elements, each of the display elements including: a first electrode and a second electrode that are arranged opposite each other, the first electrode allowing part of incident light to pass therethrough and reflecting another part of the incident light, the second electrode reflecting light that has passed through the first electrode, and an interval between the first electrode and the second electrode is different between the multiple types of display elements; a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

In each of the display device and the electronic apparatus according to the above-described embodiment of the present disclosure, interference occurs between first reflected light that is reflected by the first electrode and second reflected light that is reflected by the second electrode(s) after entering the cavity portion through the first electrode. In addition, with the multiple types of display elements in which the interval between the first electrode and the second electrode is different between those multiple types of display elements, interference condition is changed even when the same medium is present in the cavity portion. In more detail, in accordance with the respective types of display elements, lights with different specific wavelengths are emitted to the exterior, or the lights emitted thereto are cut off.

With the optical element and the optical element array according to the above-described embodiment of the present disclosure, it is possible to exchange the media to be present in the cavity portion promptly by utilizing the electrowetting phenomenon. Accordingly, it is possible to emit lights with different specific wavelengths to the exterior on the basis of externally incident light or to cut off the lights emitted thereto, by appropriately selecting the refractive indices of the first and second media, the interval between the first and second electrode(s), and an incident angle of the incident light. This makes it possible to improve the responsibility and emit high luminance light at a low drive voltage.

With the display device and the electronic apparatus according to the above-described embodiment of the present disclosure, it is possible to display multiple colors promptly with the great reproducibility on the basis of externally incident light, despite the simple configuration, while making the displayed colors different for each of the display elements. Accordingly, the display device and the electronic apparatus equipped with the above optical element array, according to the above-described embodiment of the present disclosure, achieve precise image display according to a predetermined image signal while decreasing the power consumption.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, a detailed explanation will be given of an embodiment of the present disclosure and an application example thereof, with reference to the accompanying drawings. Note that the explanation will be provided in order listed below.
1. Embodiment (FIGS. 1 to 4B): display device
2. Application example of display device (FIGS. 5A and 5B): Electronic apparatus
[Embodiment]
(Configuration of Display Device)

Figure 1:
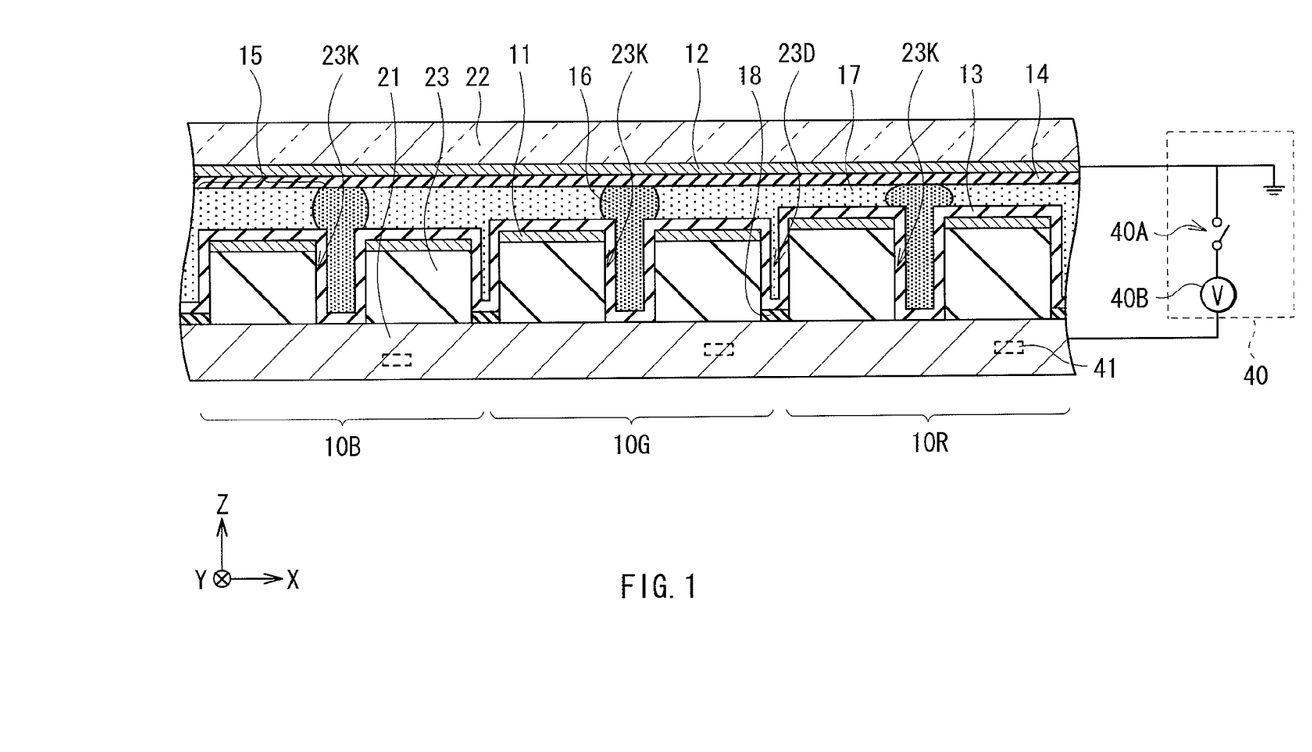
FIG. 1 is a cross-sectional view illustrating an overall configuration of a display device according to an embodiment of the present disclosure.
Figure 2:
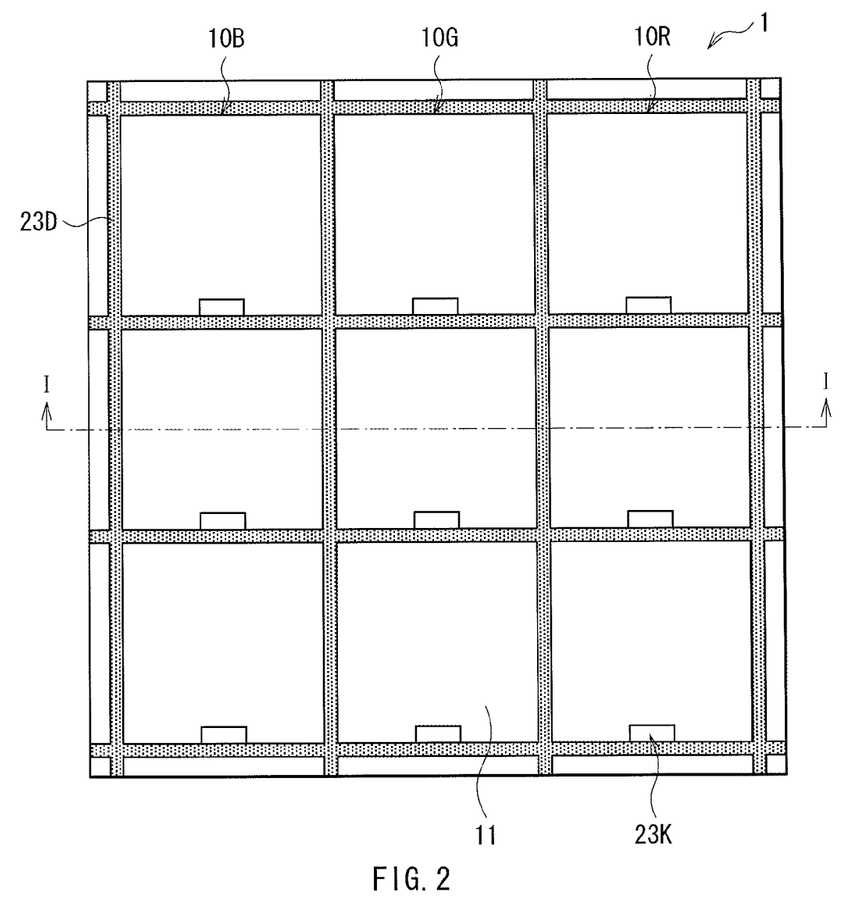
FIG. 2 is a plan view illustrating the overall configuration of the display device illustrated in FIG. 1.
Figure 3:
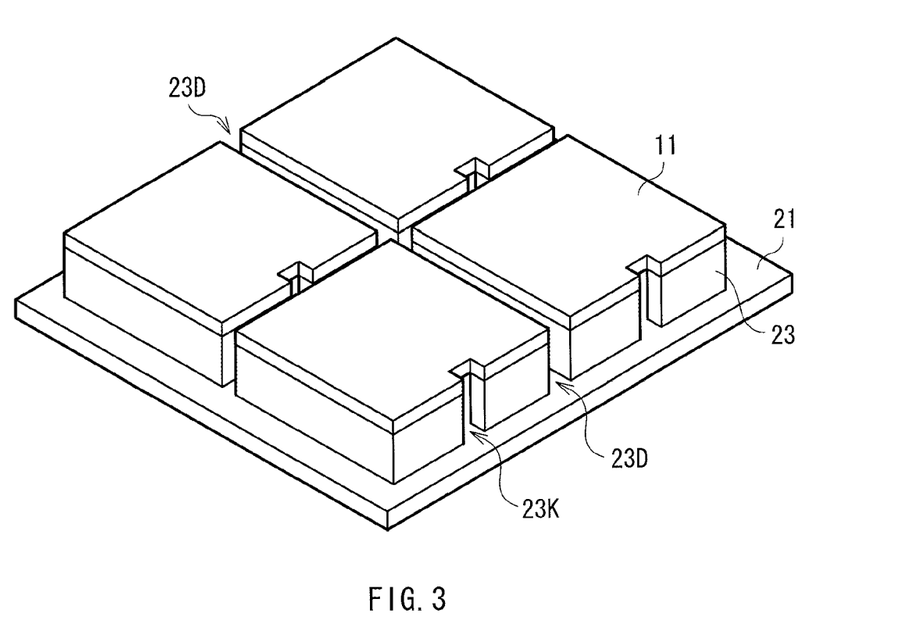
FIG. 3 is a perspective view illustrating a configuration of main part of the display device illustrated in FIG. 1.

FIG. 1 is a cross-sectional view illustrating an overall configuration of a display device 1 according to an embodiment of the present disclosure, and FIG. 2 is a plan view illustrating the overall configuration of the display device 1. Note that FIG. 1 illustrates the cross-section taken along an I-I cut-line illustrated in FIG. 2 as viewed in an arrow direction. FIG. 3 is a perspective view illustrating a configuration of main part of the display device illustrated in FIG. 1. Note that in FIGS. 2 and 3, components, such as dielectric films 13 and 14, a polar liquid 16, a non-polar liquid 17, an electrode 12, a substrate 22, and the like, are omitted for the sake of reserving the visibility.

The display device 1 has a structure where a plurality of display elements 10 are arrayed. Note that although FIG. 2 illustrates the nine display elements 10, the number of the display elements 10 is not limited to nine. As illustrated in FIG. 2, each display element 10 may have, for example, a square shape. Each display element 10 is connected to a control section 40, and the electrostatic wettability is controlled by utilizing the electrowetting phenomenon, so that a polar liquid 16 or a non-polar liquid 17 is selectively introduced into a cavity portion 15 (described later). Due to this, when external light enters each display element 10, two reflected lights that have been internally reflected in different routes interfere with each other. As a result, each display element 10 emits light with a specific wavelength, or cuts off the light. Note that the display element 10 and the display device 1 according to this embodiment are examples embodying and implementing an optical element and an optical element array, respectively, according to an embodiment of the present disclosure.

The display elements 10 have multiple types that emit lights of different colors. Concretely, for example, a plurality of red display elements 10R, green display elements 10G, and blue display elements 10B are provided, which are configured to emit red, green, and blue lights, respectively. Note that the arrangement thereof may be selected as appropriate.

Each display element 10 includes electrodes 11 and 12 that are arranged opposite each other, and dielectric films 13 and 14 that cover the electrodes 11 and 12, respectively. In this case, the plurality of electrodes 11 are provided separately from one another for each of the display elements 10. Meanwhile, the plurality of electrodes 12 are provided, each of which is common to a certain group of the display elements 10. Alternatively, the single second electrode 12 may be provided commonly to all the display elements 10. A closed space is defined between the dielectric film 13 and the dielectric film 14. This space, in particular, part of the space which is sandwiched by the electrodes 11 and the electrode 12 is referred to as a "cavity portion 15" herein. A polar liquid 16 and a non-polar liquid 17 are interposed and sealed in a space containing the cavity portion 15, as first and second media, respectively. These polar liquid 16 and non-polar liquid 17 have different refractive indices.

The control section 40 includes a switch section 40A and a power source 40B. The electrodes 11 and the electrode 12 are connected to the power source 40B. The control section 40 is configured to apply a predetermined voltage between the individual electrodes 11 and the electrode 12 in response to an operation with the switch section 40A and under the voltage control of the power source 40B. In this case, a gate driver (not illustrated) allows the control section 40 to selectively drive driving elements 41 (described later) in specific ones of the display element 10. Note that the electrode 12 may be grounded.

The electrodes 11 are formed covering the upper surfaces of corresponding seatings 23 provided on a substrate 21. The seatings 23 and the electrodes 11 are provided independently for each of the display elements 10. In other words, the individual seatings 23 and electrodes 11 in the adjacent display elements 10 are separated from one another.

The electrode 12 may be provided so as to cover, for example, a whole surface of a substrate 22, the surface being in opposition to the substrate 21. The substrate 22 may be disposed substantially parallel to the substrate 21.

The seating 23 of each display element 10 is provided with one or more storage sections 23K (FIGS. 1 to 3 illustrating a case where the single storage section 23K is provided). Each storage section 23K functions as a reservoir in which, for example, the polar liquid 16 is stored, under a situation where no potential difference arises between each electrode 11 and the electrode 12. Each storage section 23K is not limited to a notch provided at a point on a periphery of each electrode 11, for example, as illustrated in FIGS. 1 to 3. Alternatively, each storage section 23K may be, for example, a through-hole. In addition, each storage section 23K is not limited to a portion formed passing through each seating 23 in a thickness direction thereof. Alternatively, each storage section 23K may be, for example, a hole-like portion formed by recessing each seating 23 in the thickness direction.

A clearance between the adjacent seatings 23 serve as a transfer path (duct) 23D, through which the polar liquid 16 or the non-polar liquid 17 flows depending on whether or not a voltage is applied between the electrodes 11 and the electrode 12. In the duct 23D, a light-absorption film 18 that absorbs incident light (or a light-shielding film) is provided, for example, on the substrate 21 without creating any gap. This is because the generation of unwanted reflected light or transmitted light is suppressed, in order to improve the display performance. The light-absorption film (light-shielding film) 18 may be composed of an insulating material containing a pigment or a dye that absorbs light with a predetermined wavelength (for example, visible light), such as a carbon black.

A height 23h of each seating 2 differs depending on a color of emitted light. In this case, each red display element 10R has the largest height 23h, whereas each blue display element 10B has the shortest height 23h. Because the thicknesses of the electrodes 11 are substantially the same as one another, the interval "d" between the electrode 11 and the electrode 12 opposing each other in each red display element 10R becomes the shortest, and those in each green display element 10G and blue display element 10B become larger in this order. Note that it is desirable that the interval "d" of each display element 10 have no unevenness within the plane. One reason for this is to uniformize the wavelength of interfering light to be emitted from each display element 10.

The substrate 21 and the substrate 22 are arranged opposite each other while being supported by side walls (not illustrated). Each of the substrates 21 and 22 may be composed of a transparent insulating material that allows visible light to pass therethrough, such as a glass, a transparent plastic, or the like. Note that as an example of a plastic, a polycarbonate (PC), a polyethylene terephthalate (PET), a polyethylene naphthalate (PEN), a polyether sulfone (PES), and a polyolefin (PO), and the like may be given.

The electrode 12 also functions as a so-called half mirror that allows part of externally incident light (sunlight, light from an interior lamp, etc.) which has entered the electrode 12 through the substrate 22 to pass therethrough, but reflects another part thereof. The electrode 12 may have a structure in which a surface of a transparent conductive film, such as indium tin oxide (ITO), zinc oxide (ZnO), or the like, is coated with a metal film, such as chromium (Cr) or the like, or a dielectric multilayer film.

Each electrode 11 also functions as a mirror that reflects light having passed through the electrode 12, and may be composed of, for example, silver (Ag), aluminum (Al), or the like.

Each of dielectric films 13 and 14 may be a transparent body in which a water-repellent layer (not illustrated) is provided on an insulating material layer (not illustrated) containing, for example, one or more of $Al_2O_3$, $Ta_2O_5$, $ZrO_2$, $ZnO_2$, $TiO_2$, MgO, and $HfO_2$. It is desirable for the insulating material layer to be formed precisely by means of, for example, an atomic layer deposition (ALD) method, a sputtering method, a chemical vapor deposition (CVD) method, or the like. The water-repellent layer may be composed of a material that exhibits excellent electrical insulation and a water-repellent (or hydrophobic) property for the polar liquid 16 (to be exact, being hydrophilic for the non-polar liquid 17 better than the polar liquid 16 under the condition of no voltage being applied). As a concrete example of this water-repellent layer, a polyvinylidene fluoride (PVdF) or a polytetrafluoroethylene (PTFE), which is a fluorinated polymer, may be given.

The non-polar liquid 17 is an electrically insulating liquid material having a little polarity. A hydrocarbon material, such as a decane, a dodecane, a hexadecane, an undecane, or the like, or a silicone oil is appropriately applicable to this non-polar liquid 17. In addition, a high refractive index material, such as a bromonaphthalene or the like, may be mixed into a hydrocarbon material or a silicone oil, in order to increase the refractive index. Even when a voltage is applied to the non-polar liquid 17 configured above, the wettability of the non-polar liquid 17 for the dielectric film 13 is rarely influenced directly. It is desirable for the non-polar liquid 17 to have a capacity high enough to cover a desired area on the surface of the dielectric film 13 when no voltage is applied between the electrode 11 and the electrode 12.

The polar liquid 16 is a polar liquid material. For example, other than water, solvent in which an electrolyte, such as a potassium chloride, a sodium chloride, a lithium chloride, or the like, is dissolved is appropriately applicable to this polar liquid 16. When a voltage is applied to the polar liquid 16, the wettability of the polar liquid 16 for the dielectric films 13 and 14 (or a contact angle of the non-polar liquid 17 wetted to the dielectric film 13) is relatively greatly changed.

The polar liquid 16 and the non-polar liquid 17 that are interposed and sealed in the space containing the cavity portion 15 are separated from each other without being mixed, thereby creating two phases. In this embodiment, both of the polar liquid 16 and the non-polar liquid 17 are transparent.

The substrate 21 is provided with driving elements 41 (such as thin-film transistors or the like) that are arranged for the respective display elements 10, and signal line pairs (not illustrated) used to individually drive the driving elements 41, each of which includes a gate line and a data line connected to the control section 40. Alternatively, the driving elements 41 or the signal line pairs may be provided in another substrate that is independent of the substrate 21.

Each electrode 11 is connected to an end of the corresponding driving element 41. An electric potential of each electrode 11 is variable, whereas that of each electrode 12 is kept constant. Specifically, the control section 40 applies voltages between the individual electrodes 11 and the electrode 12 for each of the display elements 10, thereby controlling the interferences of reflected lights based on externally incident light for each of the display elements 10. In other words, the control section 40 switches between the emission and cut-off of lights with a specific wavelength for each of the display elements 10.

It is desirable for the non-polar liquid 17 to have a capacity high enough to be filled across the cavity portion 15, when no voltage is applied between the electrodes 11 and the electrode 12, namely, when the polar liquid 16 is stored in the storage sections 23K.

(Operation of Display Device 1)

Next, an explanation will be given of an operation of the display device 1 configured above, with reference to FIGS.

Figure 4A:
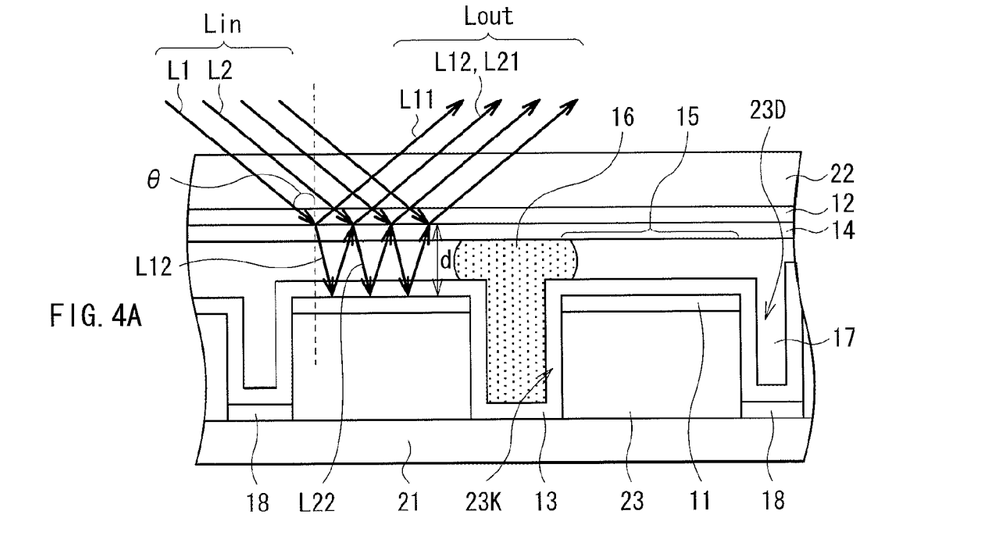
FIGS. 4A and 4B are enlarged, cross-sectional views illustrating main part of the display device illustrated in FIG. 1, for the sake of explaining an effect of the display device.
Figure 4B:
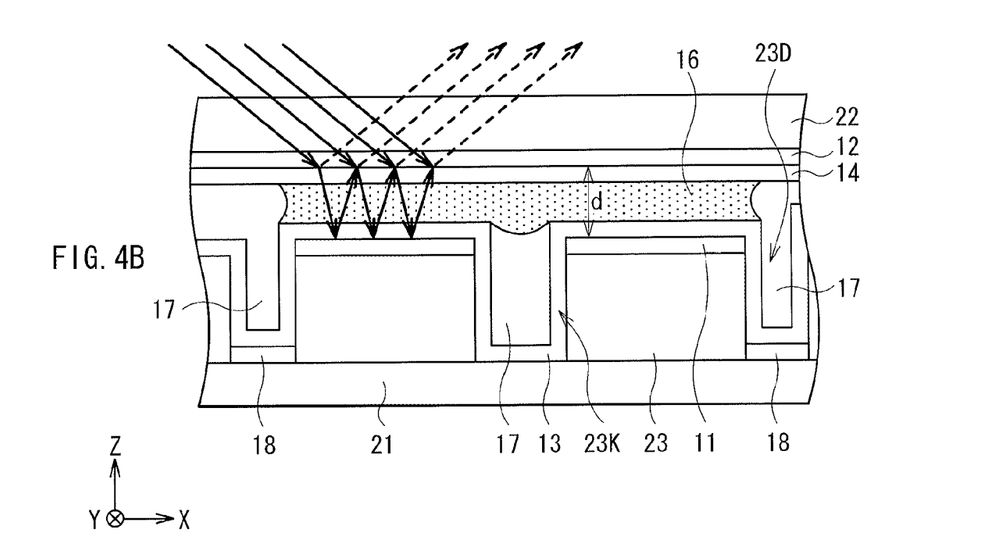

4A and 4B in addition to FIG. 1. FIGS. 4A and 4B are enlarged views illustrating any one display element 10 of the display device 1, in which FIG. 4A shows a state where no voltage is applied, and FIG. 4B shows a state where a voltage is applied.

In the case where the switch section 40A of the control section 40 is in the turn-off state and no voltage is applied between the electrode 11 and the electrode 12, the non-polar liquid 17 is in the state of spreading so as to entirely occupy the cavity portion 15, for example, as illustrated in FIG. 4A. In this case, once incident light Lin enters any display element 10, that display element 10 emits interfering light Lout with a specific wavelength. That is, the display element 10 displays a specific color. This is because the interference of the light occurs in accordance with the interval between the electrode 11 and the electrode 12, namely, a thickness "d" of the cavity portion 15.

For one reason discussed below, the interfering light Lout with a specific wavelength is generated. For example, after incident light L1 passes through the substrate 22 and the electrode 12, part of the incident light L1 is reflected by a surface of the electrode 12 and turns out to be reflected light L11. Meanwhile, light L12 of the remaining component is refracted by the surface of the electrode 12, and then, passes through the interior of the non-polar liquid 17 being present in the cavity portion 15. After that, the light L12 is reflected by a surface of the electrode 11, and then, is refracted by the surface of the electrode 12 again. Finally, the light L12 is emitted to the exterior through the substrate 22 as return light. The incident light L2, which is parallel to the incident light L1, enters the surface of the electrode 12 at a location which the light (return light) L12 that has been returned after being reflected by the surface of the electrode 11 reaches again. Part of the incident light L2 is reflected by the surface of the electrode 12, and turns out to be reflected light L21. Accordingly, the return light L12 and the reflected light L21 are emitted from the same location in the same direction. In addition, since both lights L12 and L21 are in phase, both lights are mutually intensified due to the interference.

Because the display element 10 is designed such that the return light L12 satisfies the following conditional expression (1) in this embodiment, the return light L12 and the reflected light L21 are in phase and mutually intensified, so that the interfering light Lout with a specific wavelength is generated, $$2 \times N1 \times d \times \cos\theta = m1 \times \lambda \quad (1)$$

where N1 denotes a refractive index of the non-polar liquid 17; d denotes an interval between the electrode 11 and the electrode 12; θ denotes a refraction angle at which incident light Lin enters the non-polar liquid 17 through the electrode 12; m1 denotes an integer; and λ denotes a wavelength of return light.

On the other hand, in the case where the switch section 40A of the control section 40 is in the turn-on state and a voltage is applied between the electrode 11 and the electrode 12, the polar liquid 16 is in the state of spreading so as to entirely occupy the cavity portion 15, for example, as illustrated in FIG. 4B. In this case, even when incident light Lin enters the display element 10, the display element 10 is kept dark without generating interfering light Lout. This is because the reflected light and the incident light are out of phase in this case, and both lights are mutually cancelled. For example, the light L12 and the reflected light L21 are emitted from the same location in the same direction. However, since being 180° out of phase, the light L12 and the reflected light L21 are mutually attenuated due to the interference.

Because the display element 10 is designed such that the return light L12 satisfies the following conditional expression (2) in this embodiment, the return light L12 and the reflected light L21 are out of phase and mutually cancelled, $$2 \times N2 \times d \times \cos\theta = (m2+0.5) \times \lambda \quad (2)$$

where N2 denotes a refractive index of the polar liquid 16; d denotes an interval between the electrode 11 and the electrode 12; θ denotes an incident angle at which incident light Lin enters the electrode 12; m2 denotes an integer; and λ denotes a wavelength of return light.

Therefore, by selecting the polar liquid 16 and the non-polar liquid 17 so as to satisfy the following conditional expression (3), it is possible to switch between the display state and the lights-out state for each individual display element 10, in response to the switch-on/off of the switch section 40A, $$N1 = \{(m1+0.5)/m2\} \times N2 \quad (3)$$

where N1 denotes a refractive index of the non-polar liquid 17; N2 denotes a refractive index of the polar liquid 16; and m1 and m2 each denote an integer.

In order to satisfy the above condition, for example, water (refractive index N2=1.33) and an oil (refractive index N1=1.773 or N1=2.66), which are used as the polar liquid 16 and the non-polar liquid 17, respectively, may be combined. Meanwhile, in the configuration of this embodiment, when the power source 40B turns off, the non-polar liquid 17 is filled in the cavity portion 15, establishing a state by which the interfering light Lout is generated. As a result, the display device 1 of a so-called normally white type is provided, in which the screen thereof displays a white image when no voltage is applied to all the display elements 10. For example, letting an incident angle θ be 30°, the thicknesses d of the cavity portion 15 may be approximately 263 nm (λ=700 nm), 205 nm (λ=546 nm), and 164 nm (λ=436 nm) in the red display element 10R, the green display element 10G, and the blue display element 10B, respectively.

Meanwhile, when the display device 1 of a normally black type is provided, for example, a combination of water (refractive index N2=1.33) and an oil (refractive index N1=1.995), which are used as the polar liquid 16 and the non-polar liquid 17, respectively, may be selected. For example, letting an incident angle 0 be 30°, the thicknesses d of the cavity portion 15 may be approximately 132 nm (λ=700 nm), 103 nm (λ=546 nm), and 82 nm (λ=436 nm) in the red display element 10R, the green display element 10G, and the blue display element 10B, respectively.

(Effect of Display Device)

As described above, in the display device 1 of this embodiment, interference occurs between reflected light reflected by the electrode 12 and return light reflected by the electrodes 11 after entering the cavity portion 15 through the electrode 12. In this state, by applying a voltage between the electrode 11 and the electrode 12, the polar liquid 16 is drawn to the cavity portion 15, so that the interference condition is changed. Specifically, it is possible to select as appropriate between the interference state generated when the non-polar liquid 17 is present in the cavity portion 15 and the interference state generated when the polar liquid 16 is present therein.

Accordingly, the display device 1 enables media being present in the cavity portion 15 to be exchanged promptly by utilizing the electrowetting phenomenon. As a result, by selecting the refractive indices N1 and N2, the interval d, and an incident angle θ of incident light appropriately, it is possible to emit lights with different specific wavelengths to the exterior, on the basis of externally incident light, or to cut off the lights emitted thereto. Thus, the display device 1 achieves precise, superior responsive image display according to a predetermined image signal while decreasing the power consumption. In addition, the display device 1 attains high luminance easily by disusing any color filer.

[Application Example of Display Device (Electronic Apparatus)]

Next, an explanation will be given of an application example of the above display device.

The display device 1 described above is applicable to electronic apparatuses to be used for various purposes. Therefore, the types of applied electronic apparatuses are not limited to specific ones. For example, the display device 1 may be installed in an electronic apparatus that will be described below. Needless to say, a configuration of this electronic apparatus is merely an example, and may be modified as appropriate.

Figure 5A:
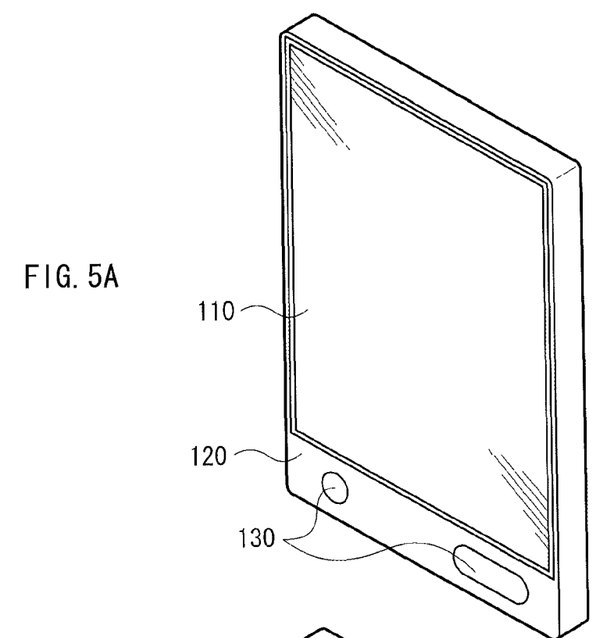
FIGS. 5A and 5B are perspective views illustrating a configuration of a tablet PC, which implements an electronic apparatus equipped with the display device.
Figure 5B:
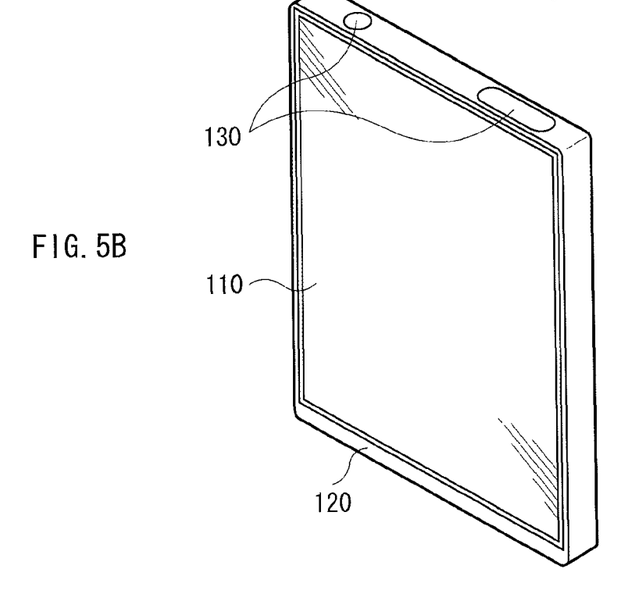

FIGS. 5A and 5B are perspective views illustrating an outer configuration of a so-called tablet personal computer (PC). This tablet PC includes, for example, a display section 110, a non-display section 120, such as a housing or the like, that supports the display section 110, and an operation section 130, such as a power source switch or the like. Note that the operation section 130 may be provided on the front surface of the non-display section 120 as illustrated in FIG. 5A, or on the upper surface thereof as illustrated in FIG. 5B. The display section 120 may be a touch screen (touch panel) equipped with an image display function and a position input function (pointing function).

The display device according to an embodiment of the present technology may be used as an image display portion for not only tablet PCs such as that illustrated in FIGS. 5A and 5B but also any other devices such as, for example but not limited to, notebook PCs, mobile phones, digital still cameras, video cameras, and navigation systems.

Up to this point, the present technology has been explained by exemplifying the embodiment described above. However, the present technology is not limited to the above embodiment, and various possible modifications may be contemplated. For example, in the above embodiment, for each of the display elements 10, the individual intervals "d" are set differently, so that the wavelengths (colors) of interfering lights emitted therefrom are adjusted. However, the present technology is not limited thereto. For example, for each of the display elements 10, a combination of material types (or refractive indices) of the polar liquid 16 and the non-polar liquid 17 may be selected. Even in this case, it is also possible to provide interfering lights of desired wavelengths. In order to realize this configuration, for example, each display element may be partitioned by an insulating barrier wall, so as to prevent the polar liquids 16 and the non-polar liquids 17 from being mixed or flowing in/out between adjacent display elements. This enables an appropriate display operation to be performed.

In the above embodiment, both of the polar liquid 16 and the non-polar liquid 17 are composed of transparent materials, but one of them may be opaque, resulting from coloring the one with a pigment or a dye that absorbs light with a predetermined wavelength, such as visible light. In this case, the display element 1 displays a black image in a state where the colored, opaque medium occupies the cavity portion 15. This configuration is advantageous in that the refractive index of the colored, opaque medium is not limited to a specific one, because the black image is not displayed by using the interference.

In the above embodiment, the combination of the polar liquid and the non-polar liquid is employed as the first and second media, respectively. The present technology is not limited thereto. For example, one of the first and second media may be a polar liquid, whereas the other may be gas (air).

The optical element and the optical element array according to an embodiment of the present technology are applicable to not only display devices but also various devices that utilize any optical effect.

Accordingly, it is possible to achieve at least the following configurations from the above-described example embodiments and the modifications of the disclosure.

<1> An optical element, including:

a first electrode and a second electrode that are arranged opposite each other, the first electrode allowing part of incident light to pass therethrough and reflecting another part of the incident light, and the second electrode reflecting light that has passed through the first electrode;

a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

<2> The optical element according to <1>, wherein the other of the first medium and the second medium is air or a non-polar liquid.

<3> The optical element according to <1> or <2>, wherein a reservoir is provided in part of a periphery of the second electrode, the reservoir storing one of the first medium and the second medium.

<4> The optical element according to any one of <1> to <3>, wherein light with a specific wavelength is emitted to exterior, the light being derived from interference between first reflected light reflected by the first electrode and second reflected light reflected by the second electrode.

<5> The optical element according to <4>, wherein the following conditional expressions (1) and (2) are satisfied:

$$2 \times N1 \times d \times \cos\theta = m1 \times \lambda \tag{1}$$

$$2 \times N2 \times d \times \cos\theta = (m2+0.5) \times \lambda \tag{2}$$

where λ denotes a wavelength of return light, d denotes an interval between the first electrode and the second electrode, N1 denotes a refractive index of the first medium, N2 denotes a refractive index of the second medium, θ denotes an incident angle at which the incident light enters the first electrode, and m1 and m2 each denote an integer.

<6> The optical element according to <4> or <5>, wherein the following conditional expression (3) is satisfied:

$$N1 = \{(m1+0.5)/m2\} \times N2 \tag{3}$$

where N1 denotes a refractive index of the first medium, N2 denotes a refractive index of the second medium, and m1 and m2 each denote an integer.

<7> The optical element according to any one of <1> to <6>, wherein the polar liquid is colored with a pigment or a dye.

<8> The optical element according to any one of <1> to <7>, wherein the other of the first medium and the second medium is a colored non-polar liquid.

<9> An optical element array, including:

a first electrode, the first electrode allowing part of incident light to pass therethrough and reflecting another part of the incident light;

a plurality of second electrodes arranged opposite the first electrode, the second electrodes reflecting light that has passed through the first electrode;

a first dielectric film and a second dielectric film covering the first electrode and the second electrodes, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

<10> The optical element array according to <9>, wherein the second electrodes are arranged apart from one another.

<11> The optical element array according to <10>, wherein a passage, through which the first medium and the second medium pass, is provided between adjacent ones of the second electrodes.

<12> The optical element array according to <10> or <11>, wherein a light-shielding film or a light absorption film is provided in a region between adjacent ones of the second electrodes.

<13> The optical element array according to any one of <9> to <12>, wherein the other of the first medium and the second medium is air or a non-polar liquid.

<14> The optical element array according to any one of <9> to <13>, wherein a reservoir is provided in part of a periphery of each of the second electrodes, the reservoir storing one of the first medium and the second medium.

<15> The optical element array according to any one of <9> to <14>, wherein light with a specific wavelength is emitted to exterior, the light being derived from interference between first reflected light reflected by the first electrode and second reflected light reflected by a corresponding one of the second electrodes.

<16> The optical element array according to <15>, wherein the following conditional expressions (1) and (2) are satisfied:

$$2 \times N1 \times d \times \cos \theta = m1 \times \lambda \quad (1)$$

$$2 \times N2 \times d \times \cos \theta = (m2+0.5) \times \lambda \quad (2)$$

where $\lambda$ denotes a wavelength of return light, d denotes an interval between the first electrode and the second electrodes, N1 denotes a refractive index of the first medium, N2 denotes a refractive index of the second medium, $\theta$ denotes an incident angle at which the incident light enters the first electrode, and m1 and m2 each denote an integer.

<17> The optical element array according to <15> or <16>, wherein the following conditional expression (3) is satisfied:

$$N1 = \{(m1+0.5)/m2\} \times N2 \quad (3)$$

where N1 denotes a refractive index of the first medium, N2 denotes a refractive index of the second medium, and m1 and m2 each denote an integer.

<18> A display device with multiple types of display elements, each of the display elements including:

a first electrode and a second electrode that are arranged opposite each other, the first electrode allowing part of incident light to pass therethrough and reflecting another part of the incident light, the second electrode reflecting light that has passed through the first electrode, and an interval between the first electrode and the second electrode is different between the multiple types of display elements;

a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

<19> An electronic apparatus with a display device, the display device being provided with multiple types of display elements, each of the display elements including:

a first electrode and a second electrode that are arranged opposite each other, the first electrode allowing part of incident light to pass therethrough and reflecting another part of the incident light, the second electrode reflecting light that has passed through the first electrode, and an interval between the first electrode and the second electrode is different between the multiple types of display elements;

a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid.

The present disclosure contains subject matter related to that disclosed in Japanese Priority Patent Application JP 2011-254286 filed in the Japan Patent Office on Nov. 21, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical element, comprising:

a first electrode and a second electrode that are arranged opposite each other, the first electrode allowing part of incident light to pass therethrough and reflecting another part of the incident light, and the second electrode reflecting light that has passed through the first electrode;

wherein a light-shielding film or a light absorption film is provided adjacent the second electrode;

a first dielectric film and a second dielectric film covering the first electrode and the second electrode, respectively; and a first medium and a second medium each interposed and sealed in a space containing a cavity portion between the first dielectric film and the second dielectric film, the first medium and the second medium having refractive indices different from one another, and one of the first medium and the second medium being a polar liquid, wherein light with a specific wavelength is emitted to an exterior, the light being derived from interference between first reflected light reflected by the first electrode and second reflected light reflected by the second electrode, and wherein the following conditional expressions (1) and (2) are satisfied:

$$2 \times N1 \times d \times \cos \theta = m1 \times \lambda \quad (1)$$

$$2 \times N2 \times d \times \cos \theta = (m2+0.5) \times \lambda \quad (2)$$

where $\lambda$ denotes a wavelength of return light, d denotes an interval between the first electrode and the second electrode, N1 denotes a refractive index of the first medium, N2 denotes a refractive index of the second medium, $\theta$ denotes an incident angle at which the incident light enters the first electrode, and m1 and m2 each denote an integer.

2. The optical element according to claim 1, wherein the other of the first medium and the second medium is air or a non-polar liquid.

3. The optical element according to claim 1, wherein a reservoir is provided in part of a periphery of the second electrode, the reservoir storing one of the first medium and the second medium.

4. An optical element, comprising:
a first electrode and a second electrode that are arranged opposite each other, the first electrode allowing part of incident light to pass therethrough and reflecting another part of the incident light, and the second electrode reflecting light that has passed through the first electrode;
wherein a light-shielding film or a light absorption film is provided adjacent the second electrode;
a first dielectric film and a second dielectric film covering the first electrode and the second electrode, respectively; and
a first medium and a second medium each interposed and sealed in a space containing a cavity portion between the first dielectric film and the second dielectric film, the first medium and the second medium having refractive indices different from one another, and one of the first medium and the second medium being a polar liquid,
wherein light with a specific wavelength is emitted to an exterior, the light being derived from interference between first reflected light reflected by the first electrode and second reflected light reflected by the second electrode, and
wherein the following conditional expression (3) is satisfied:

$$N1=\{(m1+0.5)/m2\} \times N2 \qquad (3)$$

where N1 denotes a refractive index of the first medium, N2 denotes a refractive index of the second medium, and m1 and m2 each denote an integer.

5. The optical element according to claim 1, wherein the polar liquid is colored with a pigment or a dye.

6. The optical element according to claim 1, wherein the other of the first medium and the second medium is a colored non-polar liquid.

7. An optical element array, comprising:
a first electrode, the first electrode allowing part of incident light to pass therethrough and reflecting another part of the incident light;
a plurality of second electrodes arranged opposite the first electrode, the second electrodes reflecting light that has passed through the first electrode, wherein the second electrodes are spaced from one another, and wherein a light-shielding film or a light absorption film is provided in a region between adjacent ones of the second electrodes;
a first dielectric film and a second dielectric film covering the first electrode and the second electrodes, respectively; and
a first medium and a second medium each interposed and sealed in a space containing a cavity portion between the first dielectric film and the second dielectric film, the first medium and the second medium having refractive indices different from one another, and one of the first medium and the second medium being a polar liquid.

8. The optical element array according to claim 7, wherein a passage, through which the first medium and the second medium pass, is provided between adjacent ones of the second electrodes.

9. The optical element array according to claim 7, wherein the other of the first medium and the second medium is air or a non-polar liquid.

10. The optical element array according to claim 7, wherein a reservoir is provided in part of a periphery of each of the second electrodes, the reservoir storing one of the first medium and the second medium.

11. The optical element array according to claim 7, wherein light with a specific wavelength is emitted to exterior, the light being derived from interference between first reflected light reflected by the first electrode and second reflected light reflected by a corresponding one of the second electrodes.

12. The optical element array according to claim 11, wherein the following conditional expressions (1) and (2) are satisfied:

$$2 \times N1 \times d \times \cos\theta = m1 \times \lambda \qquad (1)$$

$$2 \times N2 \times d \times \cos\theta = (m2+0.5) \times \lambda \qquad (2)$$

where λ denotes a wavelength of return light, d denotes an interval between the first electrode and the second electrodes, N1 denotes a refractive index of the first medium, N2 denotes a refractive index of the second medium, θ denotes an incident angle at which the incident light enters the first electrode, and m1 and m2 each denote an integer.

13. The optical element array according to claim 11, wherein the following conditional expression (3) is satisfied:

$$N1=\{(m1+0.5)/m2\} \times N2 \qquad (3)$$

where N1 denotes a refractive index of the first medium, N2 denotes a refractive index of the second medium, and m1 and m2 each denote an integer.

* * * * *